United States Patent [19]

Chung

[11] 4,348,462
[45] Sep. 7, 1982

[54] ABRASION RESISTANT ULTRAVIOLET LIGHT CURABLE HARD COATING COMPOSITIONS

[75] Inventor: Rack H. Chung, Clifton Park, N.Y.

[73] Assignee: General Electric Company, Waterford, N.Y.

[21] Appl. No.: 167,622

[22] Filed: Jul. 11, 1980

Related U.S. Application Data

[63] Continuation-in-part of Ser. No. 129,297, Mar. 11, 1980.

[51] Int. Cl.$^3$ ................................................. C08F 2/50
[52] U.S. Cl. ................................. 428/412; 524/868; 204/159.13; 427/54.1; 428/447; 428/418; 526/279; 528/26; 525/288; 525/404
[58] Field of Search ............... 204/159.13; 427/54.1; 428/412, 418, 447

[56] References Cited

U.S. PATENT DOCUMENTS

| | | | |
|---|---|---|---|
| 3,708,225 | 1/1973 | Misch et al. | 428/447 |
| 3,835,003 | 9/1974 | Schlessinger | 204/159.13 |
| 3,865,588 | 2/1975 | Ohto et al. | 204/159.13 |
| 3,976,497 | 8/1976 | Clark | 260/37 SB |
| 3,986,997 | 10/1976 | Clark | 260/29.2 M |
| 4,026,826 | 5/1977 | Yoshida et al. | 204/159.13 |
| 4,101,513 | 7/1978 | Fox et al. | 204/159.13 |
| 4,156,035 | 5/1979 | Tsao et al. | 204/159.11 |
| 4,177,315 | 12/1979 | Ubersax | 260/37 SB |
| 4,188,451 | 2/1980 | Humphrey | 204/159.13 |
| 4,201,808 | 5/1980 | Cully et al. | 204/159.13 |

OTHER PUBLICATIONS

Kirk Othmer, "Encyclopedia of Chemical Technology", IInd Ed., vol. 18, pp. 61–72, Interscience Pub. N.Y. (1969).

*Primary Examiner*—John C. Bleutge
*Assistant Examiner*—A. H. Koeckert

[57] ABSTRACT

A radiation curable coating composition comprising (A) colloidal silica (B) acryloxy or glycidoxy functional silanes (C) non-silyl acrylates and (D) catalytic amounts of UV light sensitive cationic and radical type photoinitiators is provided, which cures to a transparent hard coating exhibiting improved abrasion resistance.

23 Claims, No Drawings

ABRASION RESISTANT ULTRAVIOLET LIGHT CURABLE HARD COATING COMPOSITIONS

This application is a continuation in part of Ser. No. 129,297, filed Mar. 11, 1980 and which is currently co-pending.

BACKGROUND OF THE INVENTION

This invention relates to an ultraviolet radiation curable protective coating composition. More particularly, it relates to a silicone coating composition which, when applied to a substrate, forms a protective, abrasion-resistant coating thereon.

Recently, the substitution of glass glazing with transparent materials which do not shatter or are more resistant to shattering than glass, has become widespread. For example, transparent glazing made from synthetic organic polymers is now utilized in public transportation vehicles, such as trains, buses, taxis and airplanes. Lenses, such as for eye glasses and other optical instruments, as well as glazing for large buildings, also employ shatter-resistant transparent plastics. The lighter weight of these plastics in comparison to glass is a further advantage, especially in the transportation industry where the weight of the vehicle is a major factor in its fuel economy.

While transparent plastics provide the major advantage of being more resistant to shattering and lighter than glass, a serious drawback lies in the ease with which these plastics mar and scratch, due to everyday contact with abrasives, such as dust, cleaning equipment and/or ordinary weathering. Continuous scratching and marring results in impaired visibility and poor aesthetics, and often times requires replacement of the glazing or lens or the like.

One of the most promising and widely used transparent plastics for glazing is polycarbonate, such as that known as Lexan ®, sold by General Electric Company. It is a tough material, having high impact strength, high heat deflection temperature, good dimesional stability, as well as being self-extinguishing, and is easily fabricated. Acrylics, such as polymethylmethacrylate, are also widely used transparent plastics for glazing.

Attempts have been made to improve the abrasion-resistance of transparent plastics. For example, scratch-resistant coatings formed from mixtures of silica, such as colloidal silica or silica gel, and hydrolyzable silanes in a hydrolysis medium, such as alcohol and water, are known. U.S. Pat. Nos. 3,708,225, 3,986,997 and 3,976,497, for example, describe such compositions.

In copending U.S. Application Ser. No. 964,910 coating compositions having improved resistance to moisture and humidity and ultraviolet light are disclosed. It was discovered therein that, in direct contrast to the teachings of U.S. Pat. No. 3,986,997, compositions having a basic pH, i.e., 7.1–7.8, do not immediately gel but in fact provide excellent abrasion-resistant coatings on solid substrates.

The present invention offers a significant advantage over many of the heretofore known coating compositions in that it does not require heat in order to initiate the cure reaction. The radiation cure system of the present invention expends considerably less thermal energy than conventional heat cure systems.

Although it has been known that colloidal silica can be incorporated into heat cured coating systems, the present invention demonstrates for the first time that such colloidal silicas can be utilized to improve the abrasion resistance of ultraviolet light curable coatings. These results are accomplished through the specific combination of colloidal silica with acryloxy functional silanes or water miscible hydroxy acrylates, or preferably both, with catalytic amounts of UV sensitive photoinitiators.

Prior to the present invention it had not been known to so combine colloidal silica with various acryloxy functional materials in a UV system.

In copending application Ser. No. 129,297, the present applicant has disclosed a radiation curable hardcoating composition which requires the use of the acid hydrolysis product of an alkoxy functional silane. Applicant's present invention, however, provides UV-curable coatings which possess even greater abrasion resistance and yet do not require the use of any such alkoxy silanes.

Ultraviolet light is one of the most widely used types of radiation because of its relatively low cost, ease of maintenance, and low potential hazard to industrial users. Rapid photo-induced polymerizations utilizing UV light rather than thermal energy for the curing of hard coatings offer several other significant advantages. First, faster curing coatings offer substantial economic benefits. Furthermore, heat sensitive materials can be safely coated and cured with UV light without the use of thermal energy which could damage the substrate. Additionally, the essentially solvent free media reduces the necessity for expensive and time consuming pollution abatement procedures.

Accordingly, it is one object of the present invention to provide a novel protective coating for solid substrates.

Another object of this invention is to provide a radiation curable coating for solid substrates which, when applied to the substrate, provides an improved abrasion-resistant surface thereto.

Still another object of the present invention is to provide a silicone coating composition especially well-suited for providing an improved abrasion-resistant surface to transparent substrates without impairing the optical clarity of the substrate.

A further object of the present invention is to provide a coating composition which results in an improved abrasion-resistant surface when applied to metals and metallized surfaces.

SUMMARY OF THE INVENTION

A radiation curable coating composition having superior abrasion resistance comprises:

(A) 100 parts by weight of silica. This silica consists of silicon dioxide (SiO) which is in a colloidal dispersion. For example, Nalco 1034 is a dispersion consisting of 34% $SiO_2$ and 66% water by weight.

Thus the colloidal silica is utilized in an amount sufficient to provide 100 parts of silica. Colloidal silica is available in basic or acidic form. Either may be utilized, however, the acidic form (low sodium content) is prefered.

To the colloidal silica is added 5 to 500 parts and preferably 50 to 200 parts of an acryloxy functional silane or glycidoxy functional silane. These silanes assist to impart high abrasion resistance to the coating compounds but it has been found that without more, adhesion is poor. To improve adhesion, there is added in addition to these acryloxy and glycidoxy functional silanes, from 10 to 500 parts, and preferably 50 to 200 parts of (C) a non-silyl acrylate material. Especially preferred acrylates are water miscible hydroxy acrylates. Non-hydroxy acrylates could be utilized but are not preferred since they are less miscible in water. In these systems water is useful as a viscosity reducing agent.

The above described ingredients are catalyzed with catalytic amounts of (D) ultraviolet light sensitive photoinitiators or blends of such initiators. Radical type initiators can be utilized alone but it is preferred that a combination of radical and cationic type photoinitiators be utilized for improved abraision resistance. Indeed, when acidic colloidal silica is used it is required that there be such a combination of photoinitiators. The radical-type catalysts are used to cure the acryloxy functional portions of the composition whereas the cationic-type catalysts cure the siloxane portions. As stated, a combination of catalysts gives tighter cure properties and improved abrasion resistance.

The catalytic amounts of these photoinitiators may vary but ordinarily the cationic type catalyst such as the hereinafter described onium salts will be present in an amount of approximately, 0.05 to 5.0% by weight based upon the amounts of ingredients A, B, and C, and preferably will be present in an amount of from 0.1 to 1.5%. The radical type photoinitiators will ordinarily be present in an amount of, approximately 0.5 to 5.0% by weight of ingredients A, B, and C, and preferably will be present in an amount of, approximately, 1 to 3% by weight.

DESCRIPTION OF THE INVENTION

The radiation curable coating compositions of the present invention are provided by mixing (A) an amount of colloidal silica sufficient to provide 100 parts by weight of silica with 5 to 500 parts of (B) acryloxy or glycidoxy functional silanes or mixtures thereof, and 10 to 500 parts by weight of (C) a non-sylyl acrylate. This mixture is catalyzed by combining it with effective amounts of ultraviolet light sensitive catalysts, which will preferably be a blend of radical-type and cationic-type UV catalysts. The catalyzed compositions can then be coated by well known techniques onto selected substrates such as Lexan and cured by exposure to ultraviolet radiation.

The silica (A) is ordinarily sold in dispersion form. For example, Nalco 1034 is a solution containing 34% $SiO_2$.

The second major ingredient is ingredient (B) which is the acid hydrolysis product of an acryloxy-functional silane or the acid hydrolysis product of a glycidoxy-functional silane or mixtures thereof. The acryloxy-functional silane has a general formula given by (II)

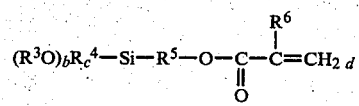
(II)

wherein $R^3$ and $R^4$ are the same or different monovalent hydrocarbon radicals, including halogenated species of such radicals. Preferably, $R^3$ and $R^4$ will be lower alkyl radicals such as methyl, ethyl, propyl, etc., but may include other saturated and unsaturated species including vinyl, aryl, etc. $R^5$ is a divalent hydrocarbon radical having from 2 to 8 carbon atoms. $R^6$ is a hydrogen or a monovalent hydrocarbon radical. The letter b is an integer from 1 to 3, c is an integer from 0 to 2 and d is an integer equaling $4-b-c$. In many of the embodiments of the present invention, be will ordinarily be 3, c will be 0 and d will equal 1. Specific examples of acryloxy-functional silanes include:

3-methacryloxypropyltrimethoxysilane
3-acryloxypropyltrimethoxysilane
2-methacryloxyethyltrimethoxysilane
2-acryloxyethyltrimethoxysilane
3-methacryloxypropyltriethoxysilane
3-acryloxypropyltriethoxysilane
2-methacryloxyethyltriethoxysilane
2-acryloxyethyltriethoxysilane Such acryloxy-functional silanes are commercially available. For example, 3-methacryloxypropyltrimethoxysilane can be obtained from Union Carbide. The second major constituent (Ingredient B) of the coating composition may also be a glycidoxy-functional silane instead of the acryloxy-functional silane just described, or it may be a combination or mixture of both types of silanes. A glycidoxy-functional silane has the general formula given by (III)

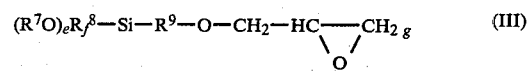
(III)

wherein $R^7$ and $R^8$ are the same or different monovalent hydrocarbon radicals as described above for $R^3$ and $R^4$. $R^9$ is a divalent hydrocarbon radical having from 2 to 8 carbon atom. The letter e is an integer from 1 to 3, f is an integer from 0 to 2 and g is an integer equaling $4-e-f$. Specific examples of useful glycidoxy-functional silanes are the following:

3-glycidoxypropyltrimethoxysilane
2-glycidoxyethyltrimethoxysilane
3-glycidoxypropyltriethoxysilane
2-glycidoxyethyltriethoxysilane These glycidoxy-functional silanes are also commercially available. One source, for example, is Petrarch Systems, Inc.

The third constituent of these hard coating compositions is (C) an acrylate compound which has been found to dramatically increase the abrasion resistance of the cured product when used with the colloidal silica described above. These acrylate compositions are considered to be non-silyl functional to distinguish them from the acryloxy functional silanes described above. These acrylates are esters of acrylic acid, but especially preferred are the water miscible hydroxy acrylates.

Among the acrylates which may be utilized in the present invention are:

2-Hydroxy ethyl acrylate
2-Hydroxy ethyl methacrylate
3-Hydroxy propyl acrylate
3-Hydroxy propyl methacrylate
2-Hydroxy-3-methacryloxy propyl acrylate
2-Hydroxy-3-acryloxy propyl acrylate
2-Hydroxy-3-methacryloxy propyl methacrylate
Diethylene glycol diacrylate
Triethylene glycol diacrylate
Tetraethylene glycol diacrylate
Trimethylol propane triacrylate Tetrahydro Furfuryl methacrylate
1-6-Hexanediol diacrylate To this mixture must be added a catalytic amount of (D) a photoinitiator. Effective photoinitiators are radiation sensitive aromatic halonium, sulfonium or phosphonium salts which have been described in the literature.

Cationic photoinitiators have been described by Crivello in numerous U.S. patents and applications, such as the following, for example, which are hereby incorporated by reference: U.S. Pat. No. 4,136,102 issued Jan. 23, 1979 and U.S. Pat. No. 3,981,897 issued Sept. 21, 1976. Such cationic photoinitiators can have the general formula given by (IV)

$$(R^{10}-C_6H_4)_n X^+ MQ_h^- \qquad (IV)$$

In this formula, X is a radical selected from I, P or S. M is a metal or metalloid and Q is a halogen radical selected from Cl, F, Br, or I. $R^{10}$ is hydrogen or a monovalent hydrocarbon radical having from 1 to 12 carbon atoms. The letter h is an integer having the value of 4 to 6 inclusive, and n is an integer having the value of 2 or 3.

The expression $MQ_h^-$ applies to any number of ionic species but preferably will be selected from $SbF_6^-$, $AsF_6^-$, $BF_4^-$ and $PF_6^-$. Particular cationic catalysts include diphenyl iodonium salts of tetrafluoro borate, hexafluoro phosphate, hexafluoro arsenate, and hexafluoro antimonate; and triphenyl sulfonium salts of tetrafluoroborate, hexafluoro phosphate, hexafluoro phosphate, hexafluoro arsenate, and hexafluoro antimonate.

It is ordinarily preferable to utilize approximately 0.1 to 1.5 parts by weight of the cationic photoinitiator for every 100 parts by weight of the mixture of ingredients A, B and C as described above. However, depending upon individual desired process parameters such as rate of cure and ultimate abrasion-resistance, the amount of the photoinitiator can range from approximately 0.05 to 5 parts by weight per 100 parts of the mixture of ingredient A, B, and C.

These cationic photoinitiators are particularly effective for initiating a cross-linking reaction upon exposure to ultraviolet radiation. Good hard coatings having excellent adhesion can thus be obtained when the coating composition is applied to a substrate and exposed to radiation such as that provided by UV lamps.

Improved abrasion-resistance can be obtained with the same hard coating compositions when in addition to the cationic photoinitiators described above, there is also utilized a radical-type initiator which is effective for cross-linking or self-condensing the acryloxy-functional portions of the silanes contained in the composition. Such radical photoinitiators include among others, benzoin ethers, alpha-acyloxime esters, acetophenone derivatives, benzil ketals and ketoneamine derivatives. Specific examples of these photoinitiators include ethyl benzion ether, isopropyl benzoin ether, dimethoxyphenyl acetophenone, and diethoxy acetophenone.

The mixed products of ingredients A, B, and C can be effectively catalyzed to form satisfactory radiation curable hard coatings by combining 100 parts by weight of such products and mixtures with from, approximately, 0.5 to 5.0 parts by weight of a combination of photoinitiators. The photoinitiator combination will be comprised of, approximately, 10 to 90% by weight of a cationic-type initiator such as diphenyliodoniumhexafluoroarsenate and the remaining portion is a radical-type initiator such as ethylbenzoin ether.

The UV-curable coating composition of the present invention is ordinarily coated on at least one surface of some solid substrate. The solid substrate may be comprised of a synthetic organic polymer or a metal or even glass, also included are synthetic organic polymer substrates which themselves have a metallized surface.

Prior to the composition being coated upon a substrate there may optionally be included a priming step wherein a primer such as a thermosetting acrylic emulsion could first be applied to the substrate. After the coating composition is applied to the substrate or the primed substrate, the coating may be cured thereon by an effective amount of UV-radiation, which may be obtained from for example, a Hanovia 550 watt lamp or a PPG Processor, Model QC1202.

The coating compositions of the present invention can be applied to a variety of solid substrates by conventional methods, such as flowing, spraying or dipping, to form a continuous surface film. Optimum coating thickness are obtained by slow dip coating procedures. Substrates which are especially contemplated herein are transparent and non-transparent plastics and metals. More particularly, these plastics are synthetic organic polymeric substrates such as acrylic polymers like poly(methylmethacrylate), polyesters, such as poly (ethylene terephthalate), poly (butylene terephthalate), etc., polyamides, polyimides, acrylonitrile-styrene copolymers, styrene-acrylonitrile-butadiene copolymers, polyvinyl chloride, butyrates, polyethylene and the like. The coating compositions of this invention are especially useful as coatings for polycarbonates, such as poly (bisphenol-A carbonate) and those polycarbonates known as Lexan ®, sold by General Electric Company, and as coatings for injection moded or extruded acrylics, such as polymethylmethacrylates. Metal substrates on which the present protective coatings are also effective include bright and dull metals like aluminum and bright metallized surfaces like sputtered chromium alloy. Other solid substrates contemplated herein include wood, painted surfaces, leather, glass, ceramics and textiles.

By choice of the proper formulation, application conditions and pretreatment of the substrate including the use of primers, the coatings can be adhered to substantially all solid substrates. A hard coating having all of the aforementioned characteristics and advantages is obtained by the removal of any residual solvent and volatile materials such as methanol or ethanol byproducts of the hydrolysis reactions. Note that except for such residual moieties the present invention provides essentially solventless coating compositions.

Coating thicknesses may vary but for improved abrasion-resistance coating thickness of 3-10 microns and preferably 5 microns, are utilized. In the following examples $\Delta\% H_{500}$ is a quantitative measure of haze on coated products according to the Taber Abrasion Resistance test.

In order that those skilled in the art may better understand how to practice the present invention, the following examples are given by way of illustration and not by way of limitation. In each example a sufficient amount of colloidal silica is utilized to provide the indicated amount of colloidal silica.

EXAMPLE 1

Into a 500 cc-3-necked flask was placed 175 g of colloidal silica (about 59.5 g silica) (Nalco 1034A, 34% $SiO_2$). 47 g of methacryloxypropyl trimethoxysiloxane (MPTMS) (Petrarch System Inc.) was then added dropwise over a period of 20 minutes at 25° C. After stirring for an additional 40 min., the mixture of 68 g of 2-hydroxyethyl acrylate and 25 g of diethyleneglycoldiacrylate was added. The slightly hazy solution was then combined with 1 g of diphenyliodoniumhexafluoroarsenate and 2.5 g of ethylbenzoin ether is photoinitiators. This catalyzed mixture was flow-coated on Lexan® and air-dried for 40 min. and cured under UV light in 6 seconds in a nitrogen atmosphere to give a clear hard coating with good adhesion.

EXAMPLE 2

To 750 g of colloidal silica (Nalco 1034A) was added dropwise 118 g of MPTMS (A-174, Union Carbide), at 25° C. After stirring for 15 min., 240 g of 3-glycidoxypropyltrimethoxy silane (GPTMS) (Petrarch System) was added dropwise over the course of 30 min. while the temperature was kept below 30° C. The mixture was then stirred at 25° C. for one hour, and combined with 300 g of 2-hydroxyethylacrylate, 88 g of diethyleneglycoldiacrylate, 88 g of tetrahydrofurfurylmethacrylate, 4.4 g of bistoluyliodoniumhexafluoroarsenate and 15 g of ethylbenzoin ether.

This composition was flow-coated on Lexan and cured under UV-light in 3 seconds to provide a transparent coating having excellent abrasion resistance.

EXAMPLE 3

A mixture of 45 g of MPTMS (A-174) and 10 g of GPTMS (A-187) was added to 150 g of Nalco 1034A during 30 min. at 25° C. After stirring for 4 hours an excess of water and intrinsic solvents were removed under reduced pressure. The thick residue was then combined with 100 g of 2-hydroxy-3-methacryloxypropylacrylate (HMPA), 40 g of diethyleneglycoldiacrylate, 1.2 g of triphenylsulfoniumhexafluoroarsenate and 4 g of diethoxyacetophenone (DEAP). This was coated on Lexan and cured under UV-light within 9 seconds under a nitrogen atmosphere.

EXAMPLE 4

To 300 g of colloidal silica (Nalco 1034A) was added 90 g of 3-acryloxypropyltrimethoxysilane followed by 20 g of 3-glycidoxypropyltriethoxysilane at 20° C. After stirring for an additional 30 min. an excess of water was removed under reduced pressure. The clear residue was combined with 40 g of 2-hydroxy-3-methacryloxypropyl acrylate (HMPA) and 40 g of diethyleneglycoldiacrylate (DEGDA). This was irradiated on Lexan in the presence of a catalytic amount of triphenylsulfoniumhexafluoroarsenate and diethoxyacetophenone and cured within 6 seconds under nitrogen.

EXAMPLE 5

A mixture of 150 g of colloidal silica (Nalco 1034A) and 45 g of 3-methacryloxypropyltriethoxysilane was mixed at 25° C. for 2 hours 20 g of HMPA and 20 g of DEGDA were then added followed by 0.6 g of triphenylsulfoniumhexafluoroarsenate and 1 g of diethoxyacetophenone. It was then flow coated on Lexan and drained for 30 min. Upon exposure to UV-light for 10 seconds under nitrogen, a clear high abrasion resistant coating with good adhesion was obtained.

EXAMPLE 6

Three hard coating compositions were obtained by mixing 30% colloidal silica (Nalco 1129), 2-hydroxyethylmethacrylate (HEMA) and 3-glycidoxypropyltrimethoxysilane (GPTMS) according to the parts by weight (pbw) given in the following table. To each of these mixtures was added a blend of photoinitiators consisting of 0.04 parts diphenyliodonium hexafluoroarsenate and 0.04 parts ethyl benzoin ether, wherein the parts are based upon the weight of the total mixture. The catalyzed compositions were flow coated onto Lexan sheets and air dried for 30 minutes. After the coated Lexan sheets had been air dried they were exposed to radiation in a UV processor for 3 seconds thereby producing a cured high abrasion resistant transparent film. The $\Delta\% \ H_{500}$ is also indicated in the following table.

| Sample | 30% Colloidal Silica | HEMA | GPTMS | $\Delta\% \ H_{500}$ |
|---|---|---|---|---|
| A | 30 pbw | 5 pbw | 5 pbw | 1.7 |
| B | 30 | 9 | 9 | 5.4 |
| C | 30 | 5 | 9 | 2.6 |

EXAMPLE 7

Another high abrasion resistant coating composition was produced by mixing two parts by weight colloidal silica (Nalco 1034A) with one part of water. To this mixture was added, in a dropwise fashion, one part of 3-methacryloxypropyltrimethoxysilane at 25° C. After stirring for two hours, the resultant mixture was further combined with two parts 2-hydroxyethyl acrylate and 0.15 parts dephenyliodonium hexafluoroarsenate and 0.3 parts ethyl benzoin ether. The catalyzed mixture was flow coated onto Lexan and air dried for 30 minutes whereupon the coating was cured on a UV processor. Several samples all cured to high abrasion resistant coatings showing good adhesion. All samples cured in 6 to 9 seconds of UV exposure and had $\Delta\% \ H_{500}$ values of 4 to 7.

Other modifications and variations of the present invention are possible in the light of the above teachings. For example, additives and other modifying agents, such as pigments, dyes and like, may be added to the compositions of this invention. It is to be understood, however, that changes may be made in the particular embodiments described above which are within the full intended scope of the invention as defined in the appended claims.

What is claimed as new and desired to be protected by Letters Patent of the United States is:

1. A radiation curable coating composition having improved abrasion resistance, comprising:
   (A) 100 parts by weight silica provided as colloidal silica;
   (B) 5 to 500 parts by weight of an acid hydrolysis product of a compound selected from acryloxy-functional silanes having a general formula:

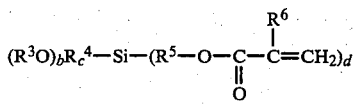

wherein $R^3$ and $R^4$ are the same or different monovalent hydrocarbon radicals, $R^5$ is a divalent hydrocarbon radical having from 2 to 8 carbon atoms, $R^6$ is hydrogen or a monovalent hydrocarbon radical, b is an integer from 1 to 3, c is an integer from 0 to 2, and d is an integer equaling $4-b-c$; or glycidoxy-functional silanes having a general formula:

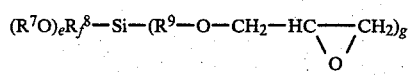

wherein $R^7$ and $R^8$ are the same or different monovalent hydrocarbon radicals, $R^9$ is a divalent hydrocarbon radical having from 2 to 8 carbon atoms, e is an integer from 1 to 3, f is an integer from 0 to 2, and g is a integer equaling $4-e-f$, and mixtures thereof;
(C) 10 to 500 parts of a non-silyl acrylate; and
(D) a catalytic amount of ultraviolet light sensitive photoinitiator.

2. A composition as in claim 1 wherein said acryloxy-functional silane is selected from the group consisting of 3-methacryloxypropyltrimethoxysilane
3-acryloxypropyltrimethoxysilane
2-methacryloxyethyltrimethoxysilane
2-acryloxyethyltrimethoxysilane
3-methacryloxypropyltriethoxysilane
3-acryloxypropyltriethoxysilane
2-methacryloxyethyltriethoxysilane
2-acryloxyethyltriethoxysilane.

3. A composition as in claim 1 wherein said glycidoxy-functional silane is selected from the group consisting of 3-glycidoxypropyltrimethoxysilane
2-glycidoxyethyltrimethoxysilane
3-glycidoxypropyltriethoxysilane
2-glycidoxyethyltriethoxysilane.

4. A composition as in claim 1 wherein said non-silyl acrylate is selected from the group consisting of:

2-Hydroxy ethyl acrylate
2-Hydroxy ethyl methacrylate
3-Hydroxy propyl acrylate
3-Hydroxy propyl methacrylate
2-Hydroxy-3-methacryloxy propyl acrylate
2-Hydroxy-3-acryloxy propyl acrylate
2-Hydroxy-3-methacryloxy propyl methacrylate
Diethylene glycol diacrylate
Triethylene glycol diacrylate
Tetraethylene glycol diacrylate
Trimethylol propane triacrylate
Tetrahydro furfuryl methacrylate
1-6-Hexanediol diacrylate.

5. A composition as in claim 1 wherein said photoinitiator is a radiation sensitive aromatic onium salt having a formula:

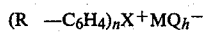

wherein X is a radical selected from I, P or S; and M is a metal or metalloid and Q is a halogen radical selected from Cl, F, Br, or I; $R^{10}$ is hydrogen or a monovalent hydrocarbon radical having 1 to 12 carbon atoms, h is an integer having a value of 4 to 6 inclusive, and n is an integer having a value of 2 or 3.

6. A composition as in claim 5 wherein $MQ_h^-$ is selected from $SbF_6^-$, $AsF_6^-$, $BF_4^-$, and $PF_6^-$.

7. A composition as in claim 1 wherein said photoinitiator is present in an amount from approximately 0.05 to 5 parts by weight of the total mixture.

8. A composition as in claim 5 wherein said photoinitiator is further combined with 0.5 to 5.0 parts of a radical-type photoinitiator.

9. A composition as in claim 8 wherein said radical-type photoinitiator is selected from ethyl benzoin ether, isopropyl benzoin ether, dimethoxyphenylacetophenone or diethoxyacetophenone.

10. The cured product of claim 1.

11. A solid substrate having at least one surface coated with the coating composition of claim 1.

12. An article as defined in claim 11 wherein the solid substrate is comprised of a synthetic organic polymer.

13. An article as defined in claim 11 wherein said solid substrate is a metal.

14. An article as defined in claim 11 wherein said solid substrate is a synthetic organic polymer having a metallized surface.

15. An article as defined in claim 12 wherein said polymer is a transparent polymer.

16. An article as defined in claim 15 wherein said polymer is a polycarbonate.

17. An article as defined in claim 16 wherein said polycarbonate is transparent.

18. An article as defined in claim 16 wherein said polycarbonate is a poly (bisphenol-A carbonate).

19. An article as defined in claim 11 wherein the coating composition has been cured on said surface of said solid substrate by an effective amount of ultraviolet radiation.

20. An article as defined in claim 11 wherein said surface of said solid substrate has been primed with a primer composition prior to having been coated with the coating composition of claim 1.

21. An article as defined in claim 20 wherein said primer composition is comprised of a thermosetting acrylic emulsion.

22. An article as defined in claim 12 wherein said polymer is polymethylmethacrylate.

23. A process for improving the abrasion resistance of a substrate with a radiation curable coating composition comprising the steps of combining:
(A) 100 parts by weight silica provided as colloidal silica;
(B) 5 to 500 parts by weight of an acid hydrolysis product of a compound selected from acryloxy-functional silanes having a general formula:

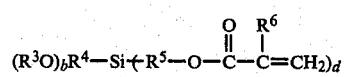

wherein $R^3$ and $R^4$ are the same or different monovalent hydrocarbon radicals, $R^5$ is a divalent hydrocarbon radical having from 2 to 8 carbon atoms, $R^6$ is hydrogen or a monovalent hydrocarbon radical, b is an integer from 1 to 3, c is an integer from 0 to 2, and d is an integer equaling $4-b-c$; or glycydoxy-functional silanes having a general formula:

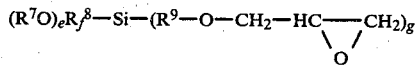

wherein $R^7$ and $R^8$ are the same or different monovalent hydrocarbon radicals, $R^9$ is a divalent hydrocarbon radical having from 2 to 8 carbon atoms, e is an integer from 1 to 3, f is an integer from 0 to 2, and g is an integer equaling $4-e-f$, and mixtures thereof;

(C) 10 to 500 parts of a non-silyl acrylate;

(D) a catalytic amount of ultraviolet light sensitive photoinitiator;

coating said radiation curable coating composition upon said substrate; and curing said coating composition upon said substrate with an amount of radiation effective for forming an improved abrasion resistant coating upon said substrate.

* * * * *